United States Patent [19]
Utsumi et al.

[11] Patent Number: 5,539,657
[45] Date of Patent: Jul. 23, 1996

[54] PICTURE IMAGE DISTRIBUTING APPARATUS PROVIDED WITHIN PASSENGER MOVING VEHICLE

[75] Inventors: Kuniaki Utsumi; Hiroaki Nakata; Susumu Morikura, all of Hirakata; Hiroaki Yamamoto, Higashiosaka; Kazuki Maeda, Sakai; Masaru Fuse, Toyonaka, all of Japan

[73] Assignee: Matsushita Electric Industrial Co., Ltd., Osaka-fu, Japan

[21] Appl. No.: 54,195

[22] Filed: Apr. 30, 1993

[30] Foreign Application Priority Data

May 8, 1992 [JP] Japan .................................. 4-116317

[51] Int. Cl.$^6$ ................................................ H04J 4/00
[52] U.S. Cl. ...................... 364/514 A; 359/133; 359/135; 359/146; 348/7; 455/6.2
[58] Field of Search ...................... 359/125, 133, 359/144, 145, 146; 348/7, 8; 455/6.2; 364/514

[56] References Cited

U.S. PATENT DOCUMENTS

| | | | |
|---|---|---|---|
| 4,726,010 | 2/1988 | Ali et al. | 359/125 X |
| 4,866,515 | 9/1989 | Tagawa et al. | 348/8 X |
| 5,058,102 | 10/1991 | Heidemann | 359/125 OR |
| 5,136,411 | 8/1992 | Paik et al. | 359/125 OR |

FOREIGN PATENT DOCUMENTS

| | | |
|---|---|---|
| 0031014A1 | 7/1981 | European Pat. Off. . |
| 0096327 | 12/1983 | European Pat. Off. . |
| 2652701 | 4/1991 | France . |
| 671845 | 9/1989 | Switzerland . |
| WO91/15927 | 10/1991 | WIPO . |

OTHER PUBLICATIONS

"Plessey Seeks fortune with in-flight communications & fun". (Integrated flight Entertainment and Services); Computergram Int.; Jul./89, n 1213.

"BTAD announces unique Optical amplifier" (Product announcement) Lasers and Technologies, v8, n2 p. 17 (1); Feb./89.
Phillips Publishing, Inc; "DAC. Norsut to Develop Fiberoptic Video Distribution Sys;"; Jan. 10, 1992; v. 7 No. 1 1051–2470.
"Architectures for Fiber–Based Local access Networks"; Telephone Engineer and Management; Aug. 1, 1990; p. 35 040–263x.
"Optical Amplifiers for Video Distribution", Huber et al., International Journal of Digital and Analog Communication Systems 1990 by NCTA vol. 3, 333–339.
"Fiber Optic Distribution System for Wideband, High Performance Video", A. R. Kline, 1991, pp. 1081–1085.
"Optical Amplifiers for Video Distribution", Huber et al., International Journal of Digital and Analog Communication Systems, vol. 3, 333–339, (1990).
"Coherent Optical Ring Using Common Local Oscillator", Kao et al., Electronics Letters, Jul. 5, 1990. vol. 26, No. 14.
"Multigigabit Per Second Subcarrier Multiplexed Optical Fibre Ring Network", R. Olshansky, Electronics Letters, Nov. 7, 1991, vol. 27, No. 23.
"Sonet Ring Applications for Survivable Fiber Loop Networks", Sosnosky et al., IEEE Communications Magazine, Jun. 29, 1991, vol. 29, No. 6.

*Primary Examiner*—Emanuel T. Voeltz
*Assistant Examiner*—Kamini S. Shah
*Attorney, Agent, or Firm*—Wenderoth, Lind & Ponack

[57] ABSTRACT

A picture image distributing apparatus provided within a passenger moving vehicle, consists of: a head end portion for multichannel FDM picture image signals; an electrical optical for converting the FDM picture image signals into optical signals; an optical amplifier for optically amplifying the optical outputs; one optical fiber transmission path connected to optical taps of unequal distribution for branching halfway on one portion of the optical power except for the branching at a final point, an optical/electrical converter for receiving optical signals branched at the final point or halfway so as to convert them into electrical signals; and a passenger seat picture image receiving terminal connected to the optical/electrical converter so as to receive the electrical signals.

31 Claims, 9 Drawing Sheets

PICTURE IMAGE DISTRIBUTING APPARATUS PROVIDED WITHIN PASSENGER MOVING VEHICLE

BACKGROUND OF THE INVENTION

The present invention generally relates to a picture image distributing apparatus provided within a passenger moving vehicle for distributing multichannel picture image signals to the respective passenger seats within the passenger moving vehicle.

The conventional picture image distributing apparatus provided within a passenger moving vehicle is one using the same coaxial cables as in, for example, CATV. The distributing operation of the signals is effected by the taking out operation of the signals where necessary by a tapping system from the coaxial cable.

A network construction of distributing optical signals using fiber optics generally uses topology of a star type using an optical branching unit of such equal distribution as shown in FIG. 9 (A), of a double star type or of a multistage star type as in FIG. 9 (B). This is because the loss of the whole network which becomes a problem in an optical signal distribution system can be reduced as much as possible since the optical branching unit having an equal distribution has the least losses. Therefore, the number of all distributions can be maximized.

As to the prior art disclosing a signal distribution using fiber optics, there is, for instance, a paper entitled "OPTICAL AMPLIFIERS FOR VIDEO DISTRIBUTION" written by D. R. HUBER and J. B. GLAAB, and published in the INTERNATIONAL JOURNAL OF DIGITAL AND ANALOG COMMUNICATION SYSTEMS, VOL. 3, pp. 333–339, (1990).

In a picture image distributing apparatus provided within a passenger moving vehicle using a tapping system using coaxial cables as in the above description, electromagnetic interference is not only easily received from the electromagnetic environment interior within the passenger moving vehicle, but also easily generates electromagnetic interference with respect to the other equipment, with a problem in that the influences upon the signals by differences and variations in the electrical ground potential are unavoidable.

In order to avoid such electromagnetic problems, fiber optics are used as a transmission path. In the network construction of a star type or a multistage star type, the number of core wires of the optical fibers to be laid in the longitudinal direction is increased within a passenger moving vehicle of narrow construction such as an airplane or train, and especially becomes greater near the head end portion. Generally, the passenger moving vehicle of a narrow construction such as an airplane and train has narrow conduit lines therein for the transmission path use or in the space for them, with a problem in that the optical fibers of many core wires must be laid. Weight increases, and the wiring becomes complicated. There is a problem in that it takes more time to detect the locations of the breaks in the optical fibers. Although the optical fibers must be connected with the optical connectors so as to be disengaged from the transmission path for maintenance, the number of optical connectors become very large, and the space needed for them becomes larger. The maintenance and repair steps increase in number. When the optical fibers are to be connected again after the disconnection thereof, a problem arises in that the discrimination between the optical fibers is difficult.

SUMMARY OF THE INVENTION

Accordingly, the present invention has been developed with a view to substantially eliminating the above discussed drawbacks inherent in the prior art, and has for its essential object to provide an improved picture image distributing apparatus provided within a passenger moving vehicle.

Another important object of the present invention is to provide an improved picture image distributing apparatus within a passenger moving vehicle capable of efficiently distributing multichannel picture image signals to the respective passenger seats within a passenger moving vehicle of a narrow construction such as an airplane and a train.

The abovenoted object may be effected by providing a picture image distributing apparatus provided within a passenger moving vehicle comprising: a head end portion, related to picture image signals, and outputting electrical signals multiplexed in frequency; an electrical/optical converter for converting electrical signals from said head end portion into optical signals; an optical amplifier for optically the optical signals from said electrical/optical converters; one optical fiber transmission path for transmitting optical signals output from said optical amplifier, said one optical fiber transmission path being connected to a plurality of optical branching units of non-equal distribution for halfway branching one portion of the optical power of the optical signals, and also being connected to optical branching units of equal or unequal distribution for branching the optical power at a final point; a plurality of optical/electrical converters for receiving optical signals branched at the final point or halfway on said optical fiber transmission path; and at least one passenger seat picture image receiving terminal connected electrically to respective optical/electrical converters for receiving electric signals from said optical/electrical converters.

The abovenoted object may also be effected by providing a picture image distributing apparatus provided within a passenger moving vehicle comprising: a head end portion, related to the picture image signals, and outputting electrical signals multiplexed in frequency; an electrical/optical converter for converting electrical signals from said head end portion into optical signals; one optical fiber transmission path for transmitting optical signals from said electrical/optical converter, said one optical fiber transmission path being connected to a plurality of optical branching units of non-equal distribution for halfway branching one portion of the optical power of the optical signals, and also being connected to optical branching units of equal of unequal distribution for branching the optical power at a final point; an optical amplifier for optically amplifying optical signals which have been damped during their transmission, said amplifier being interposed halfway of the optical fiber transmission path; a plurality of optical/electrical converters for receiving the optical signals branched at the final point or halfway on the optical fiber transmission path; and a plurality of passenger picture image receiving terminals respectively connected electrically to the plurality of optical/electrical converters, said terminals receiving the electrical signals from the optical/electrical converters.

The abovenoted object may also be effected by providing a picture image distributing apparatus provided within a passenger moving vehicle comprising: a head end portion, related to the picture image signals, and outputting electrical signals multiplexed in frequency; an electrical/optical converter for converting electrical signals from the head end portion into optical signals; a first optical amplifier for optically amplifying the optical signals from the electrical/ optical converter; one optical fiber transmission path for transmitting optical signals output from said first optical amplifier, said one optical fiber transmission path being connected to a plurality of optical branching units of non-equal distribution for halfway branching one portion of the optical power of the optical signals, and also being connected to optical branching units of equal or unequal distribution for branching the optical power at a final point; a second optical amplifier for optically amplifying optical signal which have been damped during the transmission path; a plurality of optical/electrical converters for receiving optical signals branched at the final point or halfway of the optical fiber transmission path and for converting them into electrical signals; and a plurality of passenger seat picture image receiving terminals respectively connected electrically respective optical/electrical converters so as to receive the electric signals from the optical/electrical converters.

Lastly, the above noted object may be effected by providing a picture image distributing apparatus provided within a passenger moving vehicle comprising: a head end portion, related to picture image signals, and outputting electrical signals multiplexed in frequency; an electrical/ optical converter for converting the electrical signals from the head end portion into optical signals; a first optical amplifier for optically amplifying the optical signals output from the electrical/optical converter, said first optical amplifier including a branching portion for dividing in two an optical output from said first optical amplifier; two optical fiber transmission paths, a first transmission path and a second transmission path, connected to respective branching portions for transmitting optical signals from two outputs of the branching portions, said transmission paths being connected to a plurality of optical branching units of a fusion type having two inputs and two outputs of unequal distribution for halfway branching one portion of the optical power of optical signals; a second optical amplifier for optically amplifying an optical output from a final point of the first transmission path and for inputting the amplified output to a final point of the second transmission path; a third optical amplifier for optically amplifying an output from the final point of the second transmission path and for inputting the amplified outputs to the final point of the first transmission path; a plurality of optical/electrical converters for receiving two optical signals outputted from two outputs of the optical branching units and for converting them into electrical signals so as to receive them in diversity; and at least one passenger seat picture image receiving terminal electrically connected to a respective optical/electrical converter for receiving the electrical signals from the optical/ electrical converter.

BRIEF DESCRIPTION OF THE DRAWINGS

These and other object and features of the present invention will become apparent from the following description taken in conjunction with the preferred embodiment thereof with reference to the accompanying drawings, in which.

DETAILED DESCRIPTION OF THE INVENTION

Figure 1:
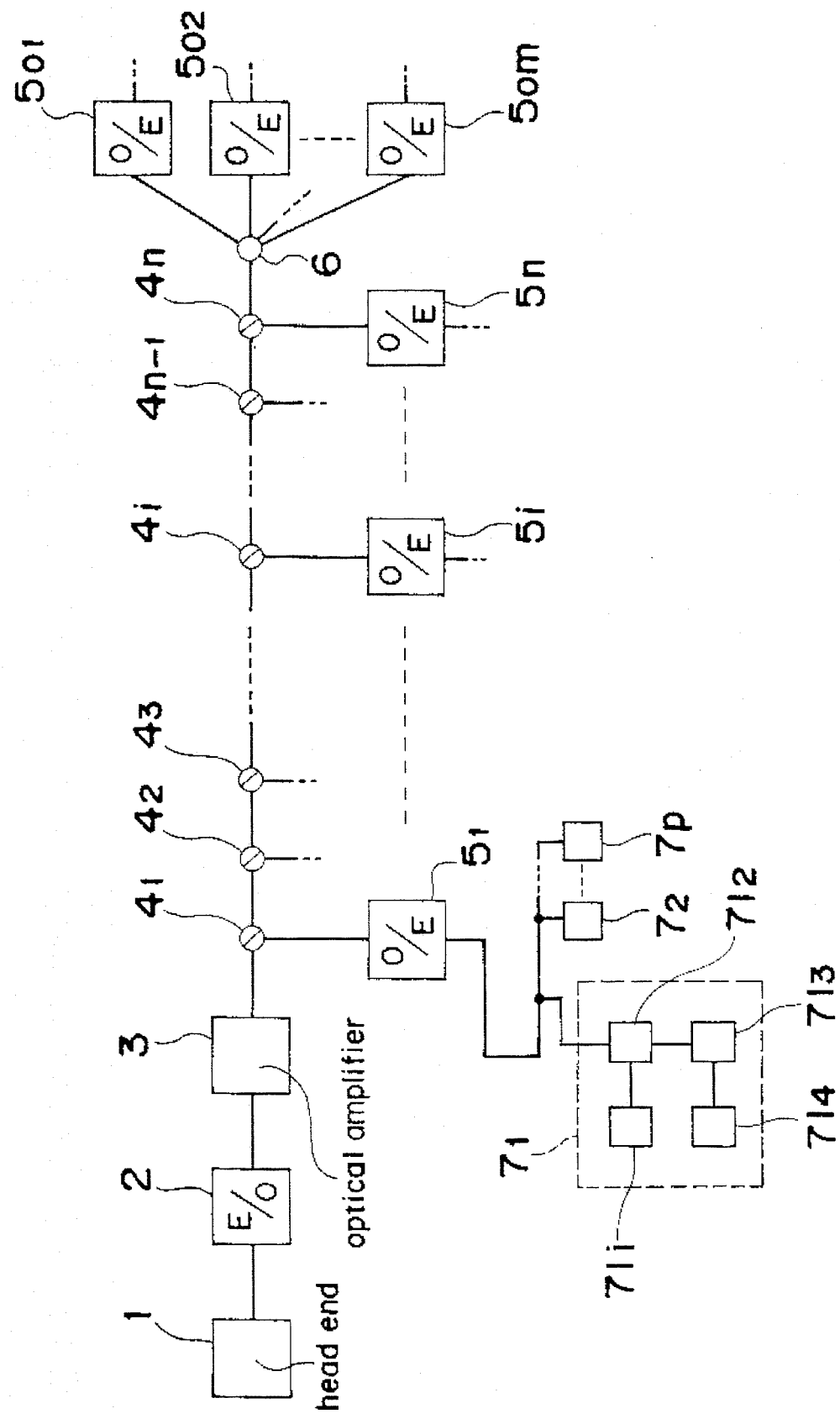
FIG. 1 is a block diagram showing the construction of a picture image distributing apparatus provided within a passenger moving vehicle in accordance with a first embodiment of the present invention.

Before the description of the present invention proceeds, it is to be noted that like parts are designated by like reference numerals throughout the accompanying drawings.

FIG. 1 is a block diagram of a picture image distributing apparatus provided within a passenger moving vehicle in accordance with a first embodiment of the present invention. The picture image distributing apparatus provided within the passenger moving vehicle is provided with a head end portion 1, an electrical to optical converter (hereinafter referred to as an "E/O converter") 2, an optical amplifier 3, optical taps $4_1$ through $4_n$ serving as optical branching units, optical to electrical converters (hereinafter referred to as "O/E converters") $5_1$ through $5_n$ and $5_{o1}$ through $5_{om}$, an optical branching unit 6, and passenger seat picture image terminals $7_1$ through $7_p$. The passenger seat picture image receiving terminals $7_1$ through $7_p$ are respectively connected to the respective O/E converters $5_2$ through $5_n$, and $5_{o1}$ through $5_{om}$ except for the O/E converter $5_1$ although they have been omitted from the drawings. Each of the passenger seat picture image receiving terminals $7_1$ is provided with a passenger channel selector $71_1$ used as a man-machine interface, a tuner $71_2$ for selectively tuning the desired channel with the output electrical signals of the O/E converter $5_1$ by controlling the passenger channel selector $71_1$, a demodulator $71_3$ for demodulating the signals of the selected channel, and a picture image display $71_4$ for displaying the demodulated picture image signals.

The head end portion 1 relates to the picture image signals so as to output electrical signals multiplex in frequency. The E/O converter 2 converts the electrical signals outputted from the head end portion 1 into optical signals. The optical amplifier 3 optically amplifies the optical signals outputted from the E/O converter 2. The optical taps $4_1$ through $4_n$ branch the light into the non-equal distribution. The O/E converters $5_1$ through $5_n$ and $5_{o1}$ through $5_{om}$ receive the optical signals from the optical taps $4_1$ through $4_n$ or the optical branching unit 6 and convert them into electrical signals. The optical branching unit 6 branches the light into the equal distribution. The passenger seat picture image receiving terminals $7_1$ through $7_p$ receive the electrical signals from the O/E converters $5_1$ through $5_n$ and $5_{o1}$ through $5_{om}$. An optical fiber transmission path is composed by the optical fibers connected among the optical amplifier 3 and the optical taps $4_1$ through $4_n$, the optical branching unit 6 and the O/E converters $5_1$ through $5_n$ and $5_{o1}$ through $5_{om}$.

The electrical signals from the head end portion 1 are converted into the optical signals by the E/O converter 2, are optically amplified by the optical amplifier 3, and outputted into the optical fiber transmission path. The optical signals branched by the optical taps $4_1$ through $4_n$ are received respectively by the O/E converters $5_1$ through $5_n$, and are converted into electrical signals, namely, signals equivalent to the output signals from the head end portion 1. The larger signal of the output optical signals from the optical tap $4_n$ is equally distributed by the optical distributing unit 6, and is received respectively by the O/E converters $5_{o1}$, through $5_{om}$, is converted into electrical signals. The passenger seat picture image receiving terminals $7_1$ through $7_p$ connected to the respective O/E converters $5_1$ through $5_n$ and $5_{o1}$ through $5_{om}$ receive the electrical signals from the O/E converters $5_1$ through $5_n$ and $5_{o1}$ through $5_{om}$, so as to reproduce the picture images.

In the side of passenger seat picture receiving terminals $7_1$, a passenger operates the channel selector $71_1$ to select the picture image program of channel to be received, by which the channel selector $71_1$ is controlled by the inputted signals so that the tuner $71_2$ selectively tunes the desired channel from the output electrical signals of the O/E converter $5_1$. The channel signal selected by the tuner $71_2$ is demodulated by the demodulator $71_3$, and the demodulated signals are displayed in reproduction by the picture display $71_4$ so that a passenger can see the picture image program of the selected channel.

The number of optical taps $4_1$ through $4_n$ and the number of optical branching units 6 are determined depending upon the level difference between the transmission and reception.

The number of passenger seat picture image receiving terminals $7_1$ through $7_p$ to be connected to the respective O/E converters $5_1$ through $5_n$ and $5_{o1}$ through $5_{om}$, depends upon the actual seat arrangement and the electromagnetic environment and is determined individually.

The electrical signals, which are related to the picture images and multiplex in frequency, to be outputted from the head end portion 1 may be one FM through FDM signal with, for example, multichannel FM picture image signals being multiplex in frequency or may be one QAM through FDM signal having the multichannel signals multiplex in frequency with the respective digital picture image signals being modulated by the QAM system. The tuning and demodulating operations of the channel may be effected by the O/E converters $5_1$ through $5_n$ and $5_{o1}$ through $5_{om}$ so as to transmit by a baseband signal form the desired picture image signals to the respective passenger seat picture image receiving terminals $7_1$ through $7_p$ from the O/E converters $5_1$ through $5_n$ and $5_{o1}$ through $5_{om}$. The tuning and QAM modulating operations of the channel may be effected by the O/E converters $5_1$ through $5_n$ and $5_{o1}$ through $5_{om}$ so as to transmit by the digital signal form the desired picture image signals to the respective passenger seat picture image receiving terminals $7_1$ through $7_p$ from the O/E converters $5_1$ through $5_n$ and $5_{o1}$ through $5_{om}$. The tuning and QAM demodulating of the channel, and the decoding of the digital picture signals may be effected by the O/E converters $5_1$ through $5_n$ and $5_{o1}$ through $5_{om}$ so as to transmit by the baseband signal form the desired picture image signals to the respective passenger seat picture image receiving terminals $7_1$ through $7_p$ from the O/E converters $5_1$ through $5_n$ and $5_{o1}$ through $5_{om}$. Namely, a signal processing function for reproducing the baseband picture image signals from the electrical signals of the FDM form is largely divided into the tuning and demodulating operations. When the modulating system is QAM, a processing function of the decoding is added to it. Although the three processing functions are taken over by the O/E converters $5_1$ through $5_n$ and $5_{o1}$ through $5_{om}$ and the passenger seat picture image receiving terminals $7_1$ through $7_p$, the signal form between the O/E portions $5_1$ through $5_n$ and $5_{o1}$ through $5_{om}$ and the passenger seat picture image receiving terminals $7_1$ through $7_p$ is determined by the way of the charging operation. The charging of the processing function is changed by the diversion of the market goods to a module to be used for the respective portions or the new integration of the functions, and is influenced even by the cost, size, suitable connection form.

For instance, when the space for providing the passenger seat picture image receiving terminal $7_1$ to $7_p$ within a customer's cabin is limited, it is desirable to give lots of functions as much as possible to the O/E converters $5_1$ to $5_n$ and $5_{01}$ to $5_{0m}$. Also, for instance, if a conventional receiver which can receive and reproduce FM picture image signals is employed, it is +e,cir NKDu+ee NKDu for the O/E converters $5_1$ to $5_n$, $5_{o1}$ to $5_{0m}$ to convert the optical signals into electric signals having proper levels to supply the signals to the passenger seat picture image receiving terminals $7_1$ to $7_p$ in the form of a bus.

On the employment of a bus form, the optical signals may be transmitted to the passenger seat picture image receiving terminals through the O/E converters $5_1$ to $5_n$ and $5_{o1}$ to $5_1$, or frequency multiplexed signals which have been converted in frequency to transmitting frequencies may be respectively transmitted to the passenger seat picture image receiving terminals $7_1$ to 7 p. At this time, each of the passenger seat picture image receiving terminals $7_1$ to 7 p only receives the signal of a frequency allotted thereto. In general, the transmitting path in the form of a bus may be relatively short.

Although the connection between the O/E converters $5_1$ through $5_n$ and $5_{o1}$ through $5_{om}$, and the passenger seat picture image receiving terminals $7_1$ through $7_p$ is made a bus type connection in the above described first embodiment, the other types of connections, such as a star type connection, may be used. Especially if the signal form in the portion is a baseband form, a star connection is suitable.

Figure 2:
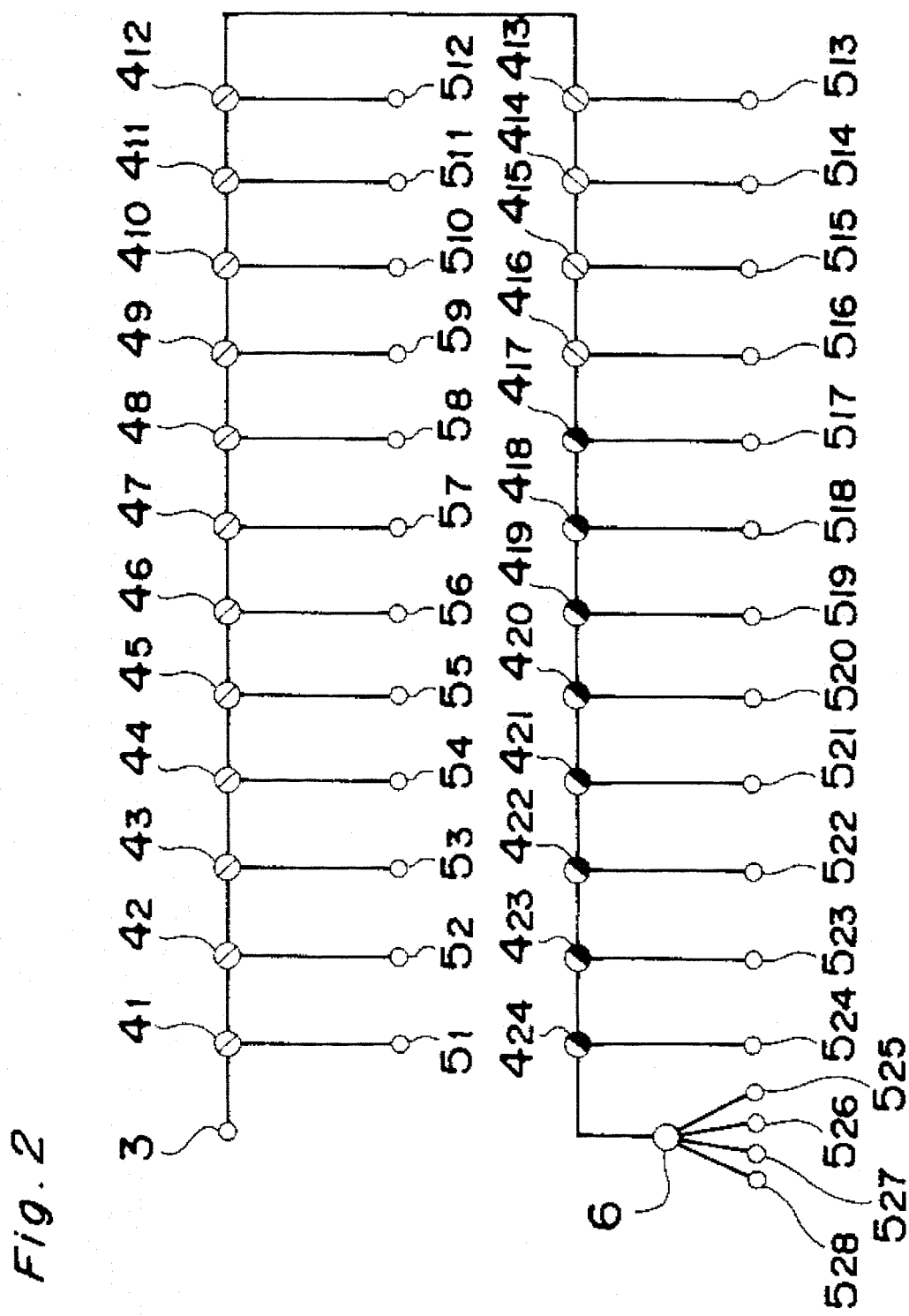
FIG. 2 is an illustrating view of a concrete embodiment of the optical branches of an optical fiber transmission path in accordance with the first embodiment of the present invention.

FIG. 2 is an illustrating view of a concrete example of an optical branching operation of the optical fiber transmission path; optical taps $4_1$ through $4_{16}$ are 20 dB taps, and optical taps $4_{17}$ through $4_{24}$ are 10 dB taps. The optical branching unit 6 has four branching units. Assume that the loss of the optical taps $4_1$ through $4_{16}$ the 20 dB taps is 22 dB and 0.5 dB in the excessive loss including, the loss of the optical taps $4_{17}$ through $4_{24}$ which are 10 dB taps is 11.5 dB and 1 dB in excessive loss including, the loss of per output of the optical branching unit 6 which has 4 branching units is 7 dB in the excessive loss including. An optical connector in one location is provided respectively among the respective optical taps $4_1$ through $4_{24}$, among the optical taps $4_{24}$ and the optical branching unit 6, between the optical tap $4_1$ and the optical amplifying portion 3 with the level difference between the transmission and the reception being 36 dB. Assume that the loss thereof is 0.2 dB per location, and the number of branches is determined as shown in FIG. 2. Namely, in this example, 28 branches are possible. Assume that four passenger seat picture image receiving terminals $7_1$ through $7_4$ can be connected respectively to twenty eight O/E converters $5_1$ through $5_{28}$, and one hundred twelve passenger seat picture receiving terminals can be connected as a whole.

To minimize the cost and maintenance of the components, only three types of components are used in this embodiment. As a matter of fact, the number of branches can be increased if more type of optical taps $4_1$ through $4_n$ and optical branching units 6 are used in accordance with the optical signal levels of the respective portions. Therefore, the passenger seat picture image receiving terminals $7_1$ through $7_p$ can be increased.

If the branching ratios among the optical taps $4_1$ to $4_n$ are proper at the respective positions, the total sum of branchings is maximized, but many kinds of optical taps $4_1$ to $4_n$ corresponding to the kinds of branching ratios are needed, so that the number of kinds becomes large, and it is necessary to always keep all kinds of branchings for exchanging during maintenance at a high cost. However, in this embodiment of the present invention, the number of kinds of branching is limited in practical use, and it results in a cost reduction and easy maintenance. In addition, at the time of installing the apparatus, the initial cost can be reduced for the installation in general.

According to the margin in the representative points, there are 13.8 dB in the input of the O/E converter $5_1$, 6.6 dB in the input of the O/E converter $5_1$, 0.3 dB in the input of the O/E converter $5_{16}$, 9.9 dB in the input of the O/E converter $5_{17}$, 0.1 dB in the input of the O/E converter $5_{24}$, and 3.2 dB in the input of the O/E converters $5_{25}$ through $5_{28}$. As the margin is considerably different in location in this manner, it is possible to further increase the number of branches if the optical signal is branched after branching at the respective optical taps 4 through $4_{24}$. The example in this case is shown.

Figure 3:
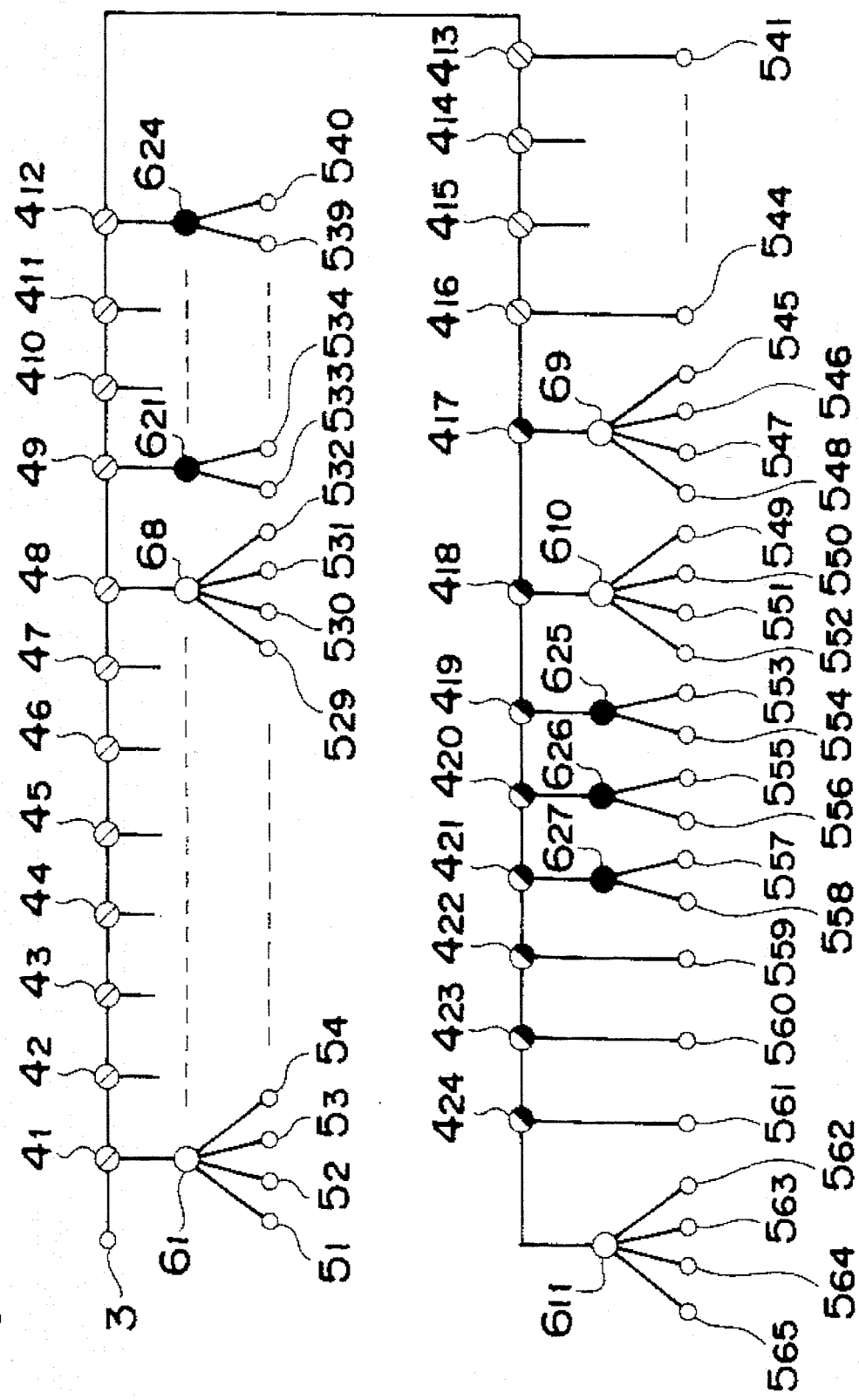
FIG. 3 is an illustrating view of another concrete embodiment of the optical branches of an optical fiber transmission path in accordance with the first embodiment of the present invention.

FIG. 3 is an illustrating view of another concrete example of the optical branches of the optical fiber transmission path. As compared with the example of FIG. 2, optical branching units $6_1$ through $6_{10}$, composed of four branching units, and optical branching units $6_{21}$ through $6_{27}$ composed of two branching units, have been added. The loss per output of the optical branching units $6_1$ through $6_{10}$ is 7 dB including the excessive loss and, the loss per output of the optical branching units $6_{21}$ through $6_{27}$ is 3.5 dB including the excessive loss, and the other conditions are the same as in the example shown in FIG. 2.

Optical branching units $6_1$ through $6_{10}$ are inserted onto the rear side of the optical taps $4_1$ through $4_8$, $4_{17}$, $4_{18}$, and optical branching units $6_{21}$ through $6_{27}$ are inserted into the rear stage side of the optical taps $4_9$ through $4_{12}$, $4_{19}$ through $4_{21}$; sixty five branches are provided. Assume that four passenger seat picture image receiving terminals $7_1$ through $7_4$ can be connected respectively with sixty five O/E converters $5_1$ through $5_{65}$, and two hundred sixty passenger seat picture image receiving terminals can be connected in total. As the network construction of the optical fiber transmission path becomes correspondingly complicated in the example, such construction may be provided as described hereinabove if possible, in accordance with the actual condition of the optical fiber laying operation.

It is an advantage to be able to increase the number of branches at the main lines of the optical fiber transmission path. As the net construction of the optical fiber transmission path becomes complicated, it is necessary to determine the construction of the apparatus on the consideration of merit of increasing the number of branches and of the problems with regard to space.

Figure 4:
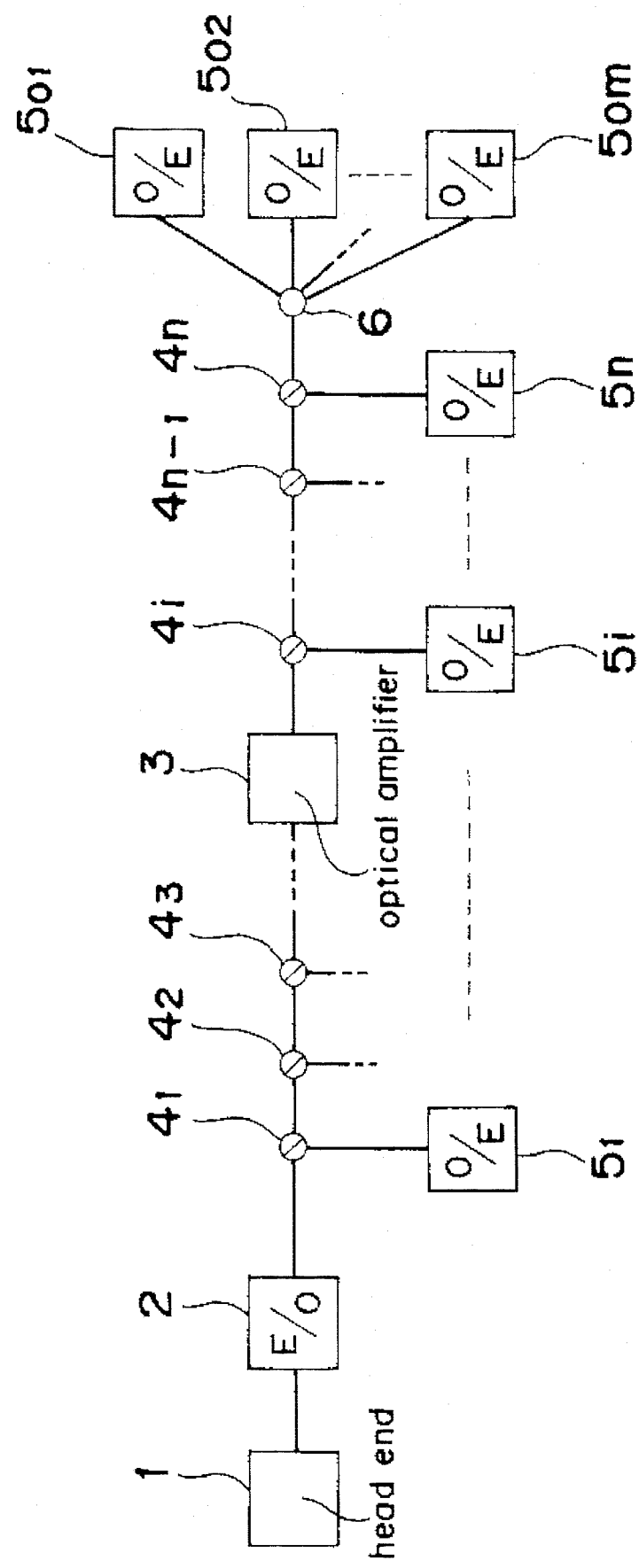
FIG. 4 is a block diagram showing the construction of a picture image distributing apparatus provided within a passenger moving vehicle in accordance with a second embodiment of the present invention.

FIG. 4 is a block diagram of a picture image distributing apparatus provided within a passenger moving vehicle in accordance with the second embodiment of the present invention. As compared with the embodiment 1 shown in FIG. 1, FIG. 4 is different from the construction in that the optical amplifier 3 is provided halfway on the optical fiber transmission path. The passenger seat picture image receiving terminals $7_1$ through $7_p$ have been omitted from the drawing.

Such a construction is adopted when the output of the E/O converter 2 is higher. Especially, when this construction is suitable when the output level is too high to place the optical amplifier 3 immediately after the E/O converter 2. The inserting position of the optical amplifier 3 is determined in the optimum location by the NF characteristics and the gains of the optical amplifier 3.

In such a construction, two methods of exciting operation are provided when the optical amplifier 3 is an optical fiber amplifier. One way is to have an excitation power supply in the optical amplifier 3, and the other method is to transmit the excitation light to the optical amplifier 3 through the same transmission path as that of the optical signal from the head end portion 1. There is an advantage in that the maintenance becomes easier by the provision of the excitation light source from the head end portion 1. The damping operation of the excitation light can be minimize if the wavelength dependency where the optical signal is branched and the excitation light is not branched is adopted in the optical taps $4_1$ through $4_n$.

By employing optical taps having the property depending on the wavelength, the optical power for exciting from the light source for optical pumping is used effectively, and the light source output power for optical pumping is minimized.

Since the optical power is amplified halfway in the optical fiber transmission path by the optical amplifier 3 to amplify the optical power, the number of branches may be increased and, in addition to that, if the optical power is amplified to a proper level, the same type of optical taps used in the optical fiber transmission path until it is amplified by the optical amplifying portion can be employed on the optical fiber transmission path after the optical amplifier 3 so that the number of kinds of optical taps can be reduced.

Figure 5:
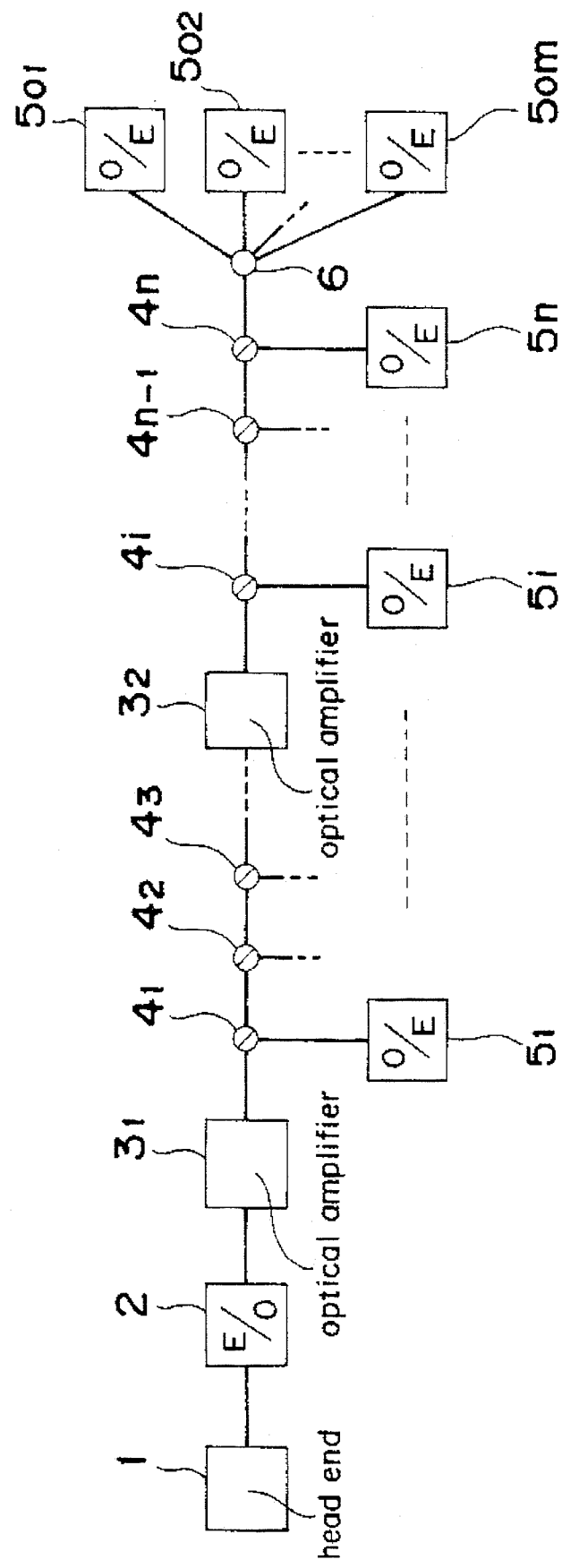
FIG. 5 is a block diagram showing the construction of a picture image distributing apparatus provided within a passenger moving vehicle in accordance with a third embodiment of the present invention.

FIG. 5 is a block diagram of a picture image distributing apparatus provided within a passenger moving vehicle in another embodiment of the present invention. FIG. 5 is different from the construction where the optical amplifier $3_2$ is added as compared with the embodiment 1 shown in FIG. 1. The passenger seat picture image receiving terminals $7_1$ through $7_p$ have been omitted from the drawing.

Such a construction can be adopted when the number of branches must be increased to more than that of the first embodiment. Namely, the optical amplifier $3_2$ functions as a repeater. Since the optical amplifier $3_2$ is not noiseless, the number of the repetition stages cannot be increased without limit.

Two exciting methods are provided when the optical amplifier $3_1$ and $3_2$ are the optical fiber amplifiers in such a construction. One is a method of having an exciting light source, and the other is a method of transmitting the exciting light as far as the optical amplifier $3_1$ and $3_2$ through the transmission path which is the same as that of the optical signal from the head end portion 1. Since the exciting light source is provided from the head end portion 1, the maintenance thereof becomes easier. If there is a wavelength dependency where the optical signal is branched, but the exciting light is not branched in the optical taps $4_1$ through $4_n$, then the damping operation of the excitation light can be minimized.

The third embodiment is a kind of combination of the previous two embodiment so that it has advantages for increasing the number of branches and for compensating for the shortage of the optical output power of the E/O converter 2 when it is small.

Also, if the light source for optical pumping, which does not contribute to the optical amplifying within the optical amplifier $3_1$ among the whole light source for optical pumping of the optical amplifier $3_1$, is transmitted to the optical amplifying portion $3_2$ through the optical fiber transmission path, it can be used effectively the optical power of the light source for optical pumping. Especially, it is more effective to employ the ones depending upon the property of wavelength to the optical taps $4_1$ to $4_n$.

Figure 6:
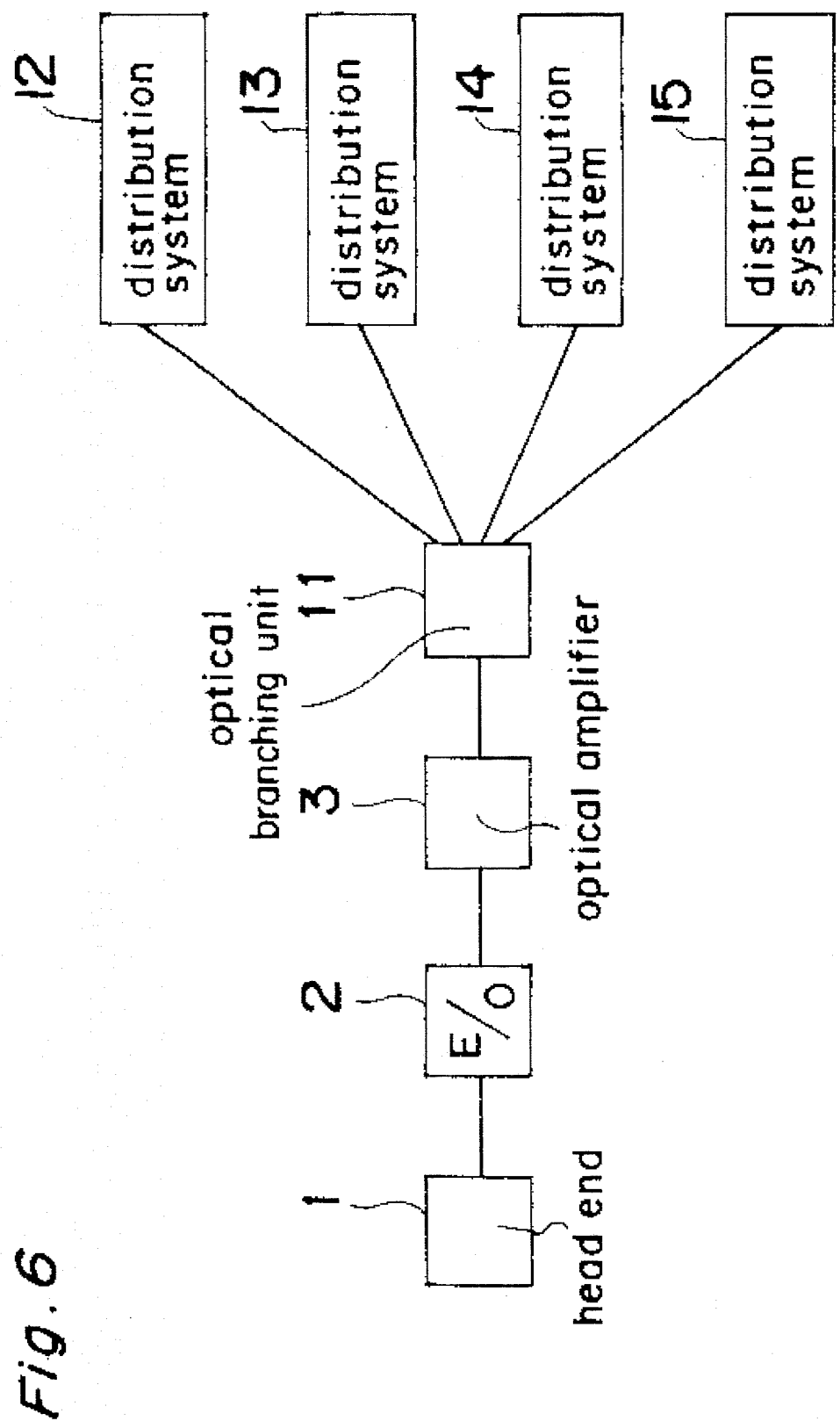
FIG. 6 is a block diagram showing the construction of a picture image distributing apparatus provided within a passenger moving vehicle in a fourth embodiment of the present invention.

FIG. 6 is a block diagram of a picture image distributing apparatus provided within a passenger moving vehicle in accordance with the fourth embodiment of the present invention. The embodiment is adapted to operate in parallel a picture image distributing apparatus provided within a passenger moving vehicle of the above described first through third embodiments. Namely, the output of the optical amplifier 3 is branched by the optical branching unit 11 composed of four branching units so as to feed them to the distributing systems 12 through 15. Each of the distributing systems 12 through 15 is shown in FIG. 2 among the distributing system including the optical fiber transmission path through the passenger seat picture receiving terminals $7_1$ through $7_p$ in the picture image distributing apparatus provided within the passenger moving vehicle in the above described first embodiment.

Such a construction assumes a passenger plane having many more passenger seats in a lateral direction and a plurality of optical fibers laid in parallel for each of the respective seat groups in the longitudinal direction so as to form four systems composed of the distributing systems 12 through 15 in parallel. In such a way, the optical fibers and the electric cables can be provided without the laying operation in the lateral direction as much as possible so that the fibers and the electric cables do not cross the aisles.

In the above described embodiment 4, the output is branched at the rear stage of the optical amplifier 3, and may be branched anywhere on the rear side from the head portion 1. Although the reliability increases as the branching point is closer to the head end portion 1, the cost increases correspondingly, so that the balance thereof has to be effected.

Although, in the above described fourth embodiment, each of the distributing systems 12 through 15 is shown in FIG. 2 among the distributing systems including from the optical fiber transmission path to the passenger seat picture image receiving terminals $7_1$ through $7_p$ in the picture image distributing apparatus provided within the passenger moving vehicle in the above described first embodiment, each of the distributing systems 12 through 15 may be shown in FIG. 2 among the distributing systems including the passenger seat picture image receiving terminals $7_1$ through $7_p$ from the optical fiber transmission path in the picture image distributing apparatus provided within the passenger moving vehicle in the above described first embodiment or among the distributing systems included from the optical fiber transmission path in the picture image distributing apparatus provided within the passenger moving vehicle in the above described second embodiment, or among the distributing systems included from the optical fiber transmission path in the picture image distributing apparatus provided within the passenger moving vehicle in the above described third embodiment to the passenger picture image receiving terminals $7_1$ through $7_p$.

Generally, the customer's cabins of the passenger moving vehicles of a large type are spaced with respect to each other by passages of two or three lines, and the setting up the transmission paths crossing over the passages is not preferable with respect to maintenance and the reliability thereof. On the contrary, the serial arrangement in the fourth embodiment has an advantage of providing an arrangement without crossing over the passages, which is useful especially in the case of installing the transmission within the wall. Also, when the optical output from the output of optical amplifier, the line can be branched after the optical amplifier and designed as a serial arrangement to decrease the number of kinds of optical taps in addition to the number of branchings is increasing, which is advantages for this embodiment.

Figure 7:
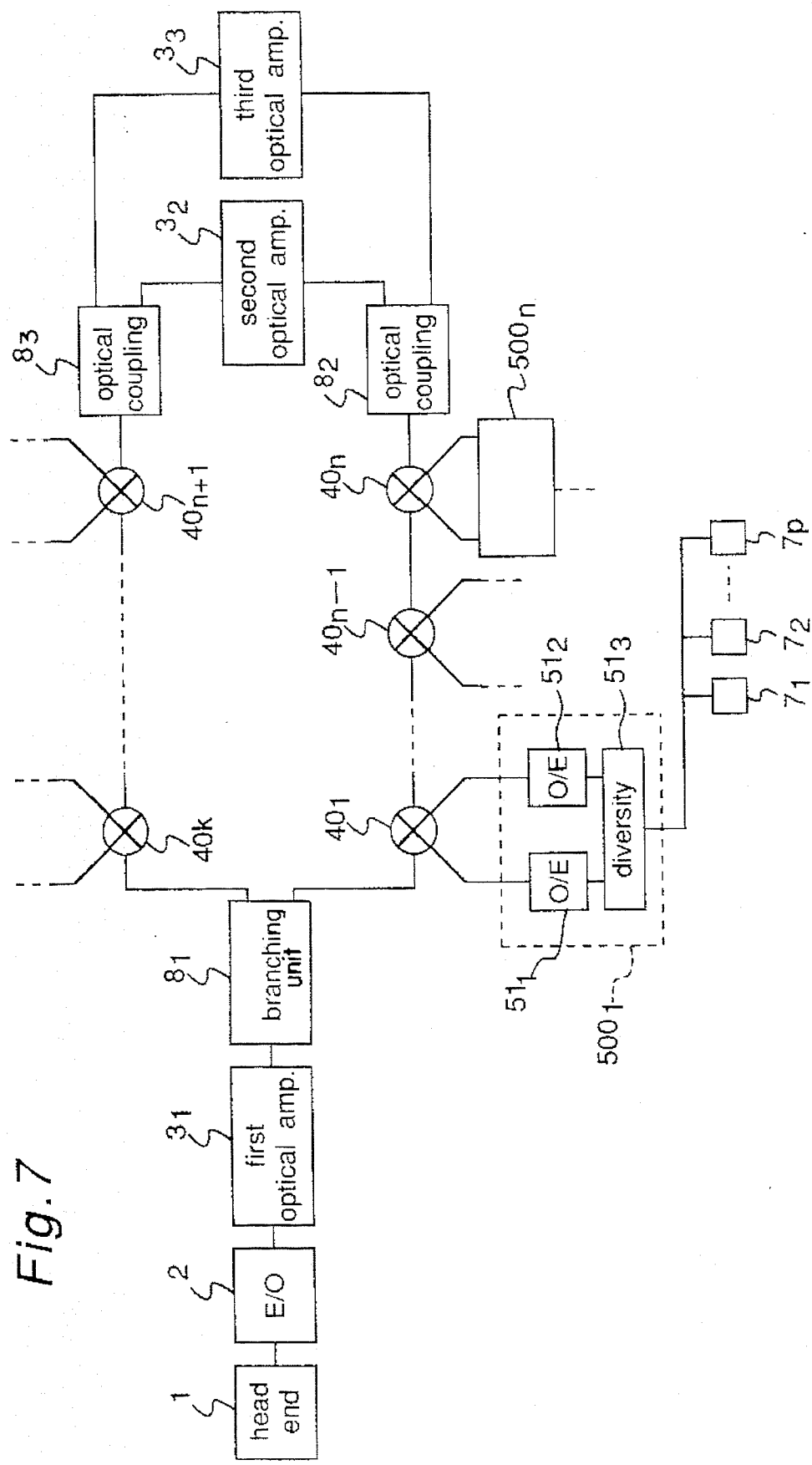
FIG. 7 is a block diagram showing the construction of a picture image distribution apparatus provided within a passenger moving vehicle in accordance with a fifth embodiment of the present invention.

FIG. 7 shows the construction of a picture image distributing apparatus provided within a passenger moving vehicle in accordance with the fifth embodiment, wherein the same components as those of the previous embodiments are designated by the same reference numbers as in the previous embodiments. In this embodiment, the optical output from the first optical amplifier $3_1$ is branched in two within the two branching units $8_1$ is outputted to two optical fiber transmission paths. In the first optical fiber transmission path there are a plurality of optical branch units of fusion type having two inputs and two outputs of non-equal distribution $40_1$ to $40_{n-1}$, $40_n$ connected with each other in series, while in the second optical fiber transmission path there are a plurality of optical branch units for fusion type having two inputs and two outputs of non-equal distribution $40_{n+1}$ to $40_k$ connected with each other in series.

There is provided at the final point of the first optical fiber transmission path a optical coupling unit $8_2$ whose output is optically amplified within the second optical amplifier $3_2$ and inputted through the optical coupling $8_3$ to the final point of the second optical fiber transmission path.

At the final point of the second optical fiber transmission path there provides an optical coupling portion $8_3$ whose output is optically amplified within the third optical amplifier $3_3$ and inputted through the optical coupling portion $8_2$ to the final point of the first optical fiber transmission path.

The two optical signals from two outputs of the optical branching units $40_1$ are received within the O/E converts $51_1$ and $51_2$ among the respective O/E converters $500_1$ and converted into electrical signals. The diversity receiving unit $51_3$ is outputted upon selecting the large one of outputs from the O/E converters $51_1$ and $51_2$. In the diversity receiving unit $51_3$ there are connected with the same passenger seat picture image receiving terminals $7_1$ to $7_p$ as in the previous embodiments, while the other optical branch units of the fusion types are connected to the apparatus having the same construction as those of the previous embodiments. The signals from the head end portion 1 is branched in two by the two branching unit $8_1$, one of which being outputted into the first optical fiber transmission path. The portion of the optical signals from the first optical fiber transmission path is output by the optical branch unit of the fusion type $40_1$ and inputted into the O\E converter $51_2$ among the O\E converters $500_1$. One of the branch outputs from the two branch units $8_1$ is outputted into the second optical fiber transmission path. The portion of the optical signals from the second optical fiber transmission path is output by the optical branch unit of the fusion type $40_1$ and inputted into the O\E converter $51_1$ among the O\E converters $500_1$. The diversity receiving unit $51_3$ among the O\E converters $500_1$ selects the greater of the outputs from the O\E converters $51_1$, and $51_2$ and outputs it into the passenger seat picture image receiving terminals $7_1$ to 7 p.

An optical circulator can be employed as the optical coupling units $8_2$ and $8_3$, but, if the loss thereof is admissible, a 3 dB optical branch unit may be employed in order to reduce the cost an easy way. If the polarized wave is constant, it can be employed an optical coupling of property depending on the polarization.

In the fifth embodiment, the optical branch units of the fusion type receive optical signals from both directions to receive signals of high quality by means of diversity receiving in addition to that, if one of the optical fiber transmission path causes some problem such as a disconnection so as not to transmit signals, it can be received signals passing through only the other optical fiber transmission path, whereby a transmission system having high a reliability can be constructed.

If only the improving of the reliability is important, then the system can be designed so as to switch only when trouble has occurred. Namely, when the system is normal, it is not necessary to operate the second optical amplifier $3_2$ and the third optical amplifier $3_3$, but, when some trouble has occurred, it is necessary to operate the second optical amplifier $3_2$ and the third optical amplifier $3_3$. With such a construction, the life of the optical amplifier can be improved, and the power consumption can be reduced. The detection of trouble is effected by observing the level or existence of the optical signals at the final point of the optical fiber transmission path, and, if some trouble has occurred, the normal optical signals on one side of the optical fiber transmission path are optically amplified and inputted into the other optical fiber transmission path. When the transmission paths of optical signals are switched at the time of the occurrence of trouble, it is not necessary to provide two sets of O/E converters for always receiving two signals from the optical branch units of the fusion type.

Figure 8:
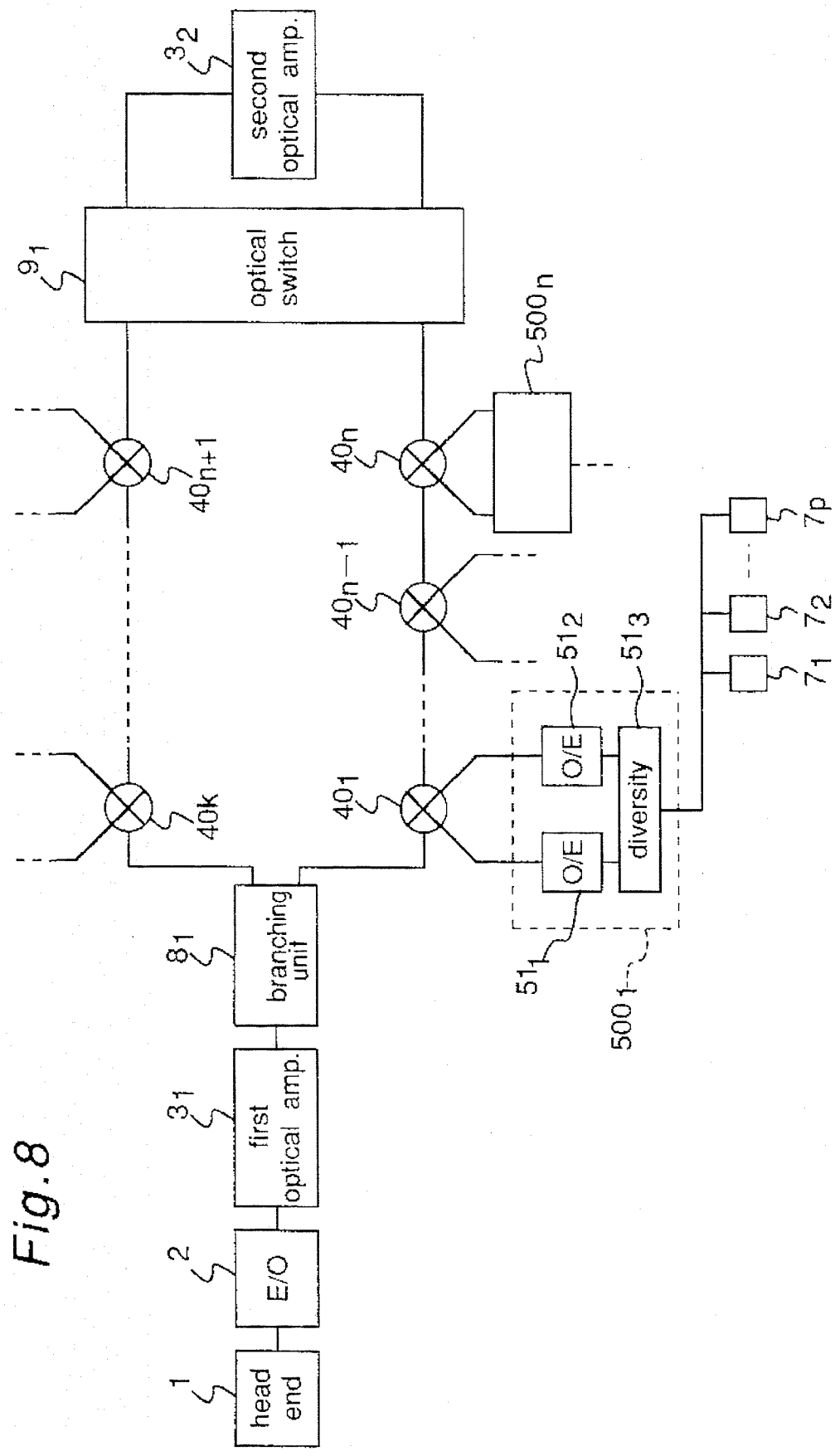
FIG. 8 is a block diagram showing a modification of the apparatus of FIG. 7.
Figure 9A:
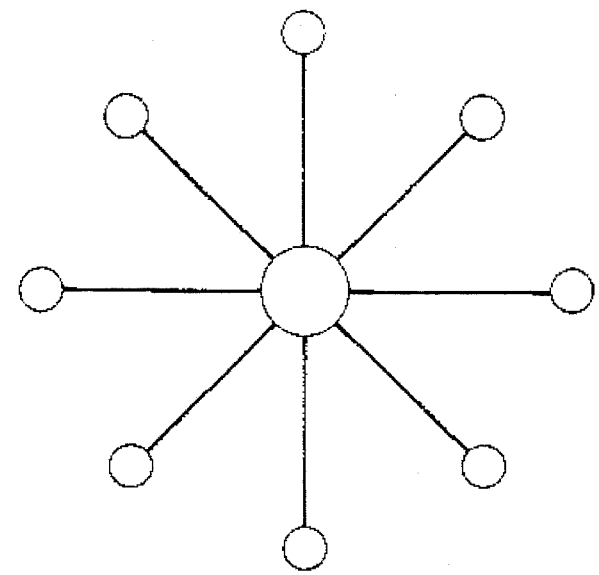
FIGS. 9 (a) and (b) a topology view showing the network construction in the construction example of the conventional picture image distributing apparatus provided within the passenger moving vehicle.
Figure 9B:
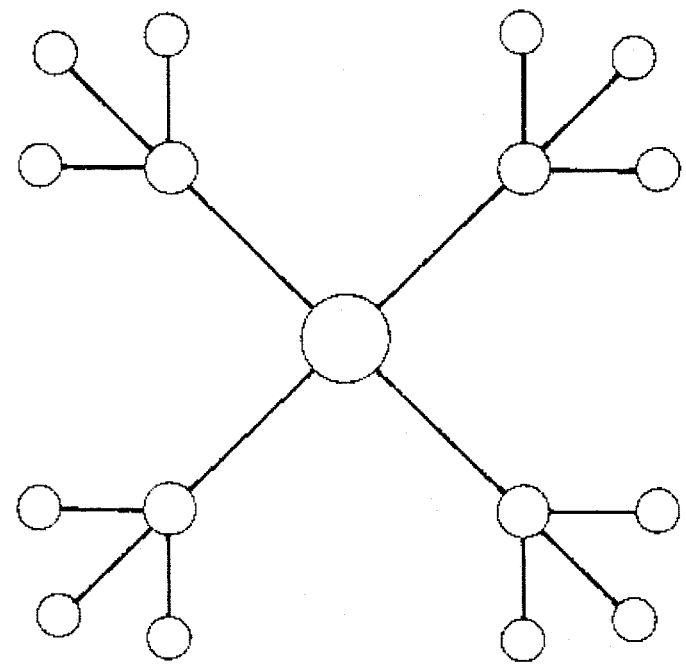

In the construction of FIG. 8, an optical switch $9_1$ is disposed between the second optical amplifier $3_2$ and the final points of the first and second optical fiber transmission paths so as to change the direction of coupling between the optical fiber transmission path and the input and output directions of the second optical amplifier $3_2$. The other components are the same to those shown in FIG. 7.

The detection of trouble is effected by observing the level or existence of the optical signals at the final point of the optical fiber transmission path, and, if some trouble has occurred, the normal optical signals on one side of the optical fiber transmission path is inputted into the second optical amplifier $3_2$ to control the optical switch $9_1$ so as to input the signals into the other optical fiber transmission path, and, if trouble has occurred at the opposite side of the optical fiber transmission path, it is necessary to control the optical switch so as to set up the reverse connection, whereby only one set of second optical amplifiers need be employed so as to reduce the cost.

Also, in the fifth embodiment, the signals are divided in two by the two branch units $8_1$, but two sets of E/O converters and two sets of optical amplifiers can be employed in such a manner that the outputs from the E/O converters at the upper side are divided in two to employ two sets of optical amplifiers, or the output from the head end portion 1 is divided in two to employ two set of the optical amplifier. However, the more the signals are divided at the more upper side, the more the number of necessary apparatus are necessary which influences as the cost and reliability.

When at least the optical fiber transmission paths and optical branch units are provided within the wall planes or under the floor of the passenger moving vehicle in addition to the parts disposed after the output point of the optical branch units being provided within the customer's cabins, the optical connectors at the side of the cabins are minimized, which are normally connected to the O=544 E converters or are covered when not used.

It is noted that optical components such as a optical fiber are often easily effected by damage or dirt to directly influence the quality of the optical signals, and therefore, it is preferable not to dispose the optical components in the air space. Within the passenger moving vehicle it is preferable not to dispose the optical components into the space of passenger seat to be easily effected by damage and dirt. At this point, if the optical fiber transmission paths and optical branch units are located within the wall or under the floor of the passenger moving vehicle, then the optical connectors will be disposed at the sides of the customer's cabins so as to not be influenced by damage and dirt.

For the same purpose, when the optical fiber transmission paths, optical branch units and O\E converters are installed within the walls or under the floor of the passenger moving vehicle, and the components connected after the output points of the optical electric converting portion being provided within the customer's cabins, then the other components having more durability with respect to damage and dirt than the optical components at the side of customer's cabin.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A picture image distributing apparatus provided within a passenger moving vehicle comprising: a head end portion, related to picture image signals, and outputting electrical signals multiplexed in frequency; an electrical/optical converter for converting electrical signals from said head end portion into optical signals; an optical amplifier for optically amplifying the optical signals from said electrical/optical converters; one optical fiber transmission path for transmitting optical signals output from said optical amplifier, said one optical fiber transmission path being connected to a plurality of optical branching units of non-equal distribution for halfway branching one portion of the optical power of the optical signals, and also being connected to optical branching units of equal or unequal distribution for branching the optical power at a final point; a plurality of optical/electrical converters for receiving optical signals branched at the final point or halfway on said optical fiber transmission path; and at least one passenger seat picture image receiving terminal connected electrically to respective optical/electrical converters for receiving electric signals from said optical/electrical converters.

2. A picture image distributing apparatus provided within a passenger moving vehicle as defined in claim 1, where the head end portion is adapted to output one FM - FDM signal multiplexed in frequency in a multichannel FM picture image signal.

3. A picture image distributing apparatus provided within a passenger moving vehicle as defined in claim 1, where the head end portion is adapted to output one QAM - FDM signal multiplexed in frequency having multichannel signals multiplexed in frequency with respective digital picture image signals being modulated by a QAM system.

4. A picture image distributing apparatus provided within a passenger moving vehicle comprising: a head end portion, related to the picture image signals, and outputting electrical signals multiplexed in frequency; an electrical/optical converter for converting electrical signals from said head end portion into optical signals; one optical fiber transmission path for transmitting optical signals from said electrical/optical converter, said one optical fiber transmission path being connected to a plurality of optical branching units of non-equal distribution for halfway branching one portion of the optical power of the optical signals, and also being connected to optical branching units of equal or unequal distribution for branching the optical power at a final point; an optical amplifier for optically amplifying optical signals which have been damped during their transmission, said amplifier being interposed halfway of the optical fiber transmission path; a plurality of optical/electrical converters for receiving the optical signals branched at the final point or halfway on the optical fiber transmission path; and a plurality of passenger picture image receiving terminals respectively connected electrically to the plurality of optical/electrical converters, said terminals receiving the electrical signals from the optical/electrical converters.

5. A picture image distributing apparatus provided within a passenger moving vehicle as defined in claim 4, where the head end portion is adapted to output one FM - FDM signal multiplexed in frequency in a multichannel FM picture image signal.

6. A picture image distributing apparatus provided within a passenger moving vehicle as defined in claim 4, where the head end portion is adapted to output one QAM-FDM signal multiplexed in frequency having multichannel signals multiplexed in frequency with respective digital picture image signals being modulated by a QAM system.

7. A picture image distributing apparatus provided within a passenger moving vehicle comprising: a head end portion, related to the picture image signals, and outputting electrical signals multiplexed in frequency; an electrical/optical converter for converting electrical signals from the head end portion into optical signals; a first optical amplifier for optically amplifying the optical signals from the electrical/optical converter; one optical fiber transmission path for transmitting optical signals output from said first optical amplifier, said one optical fiber transmission path being connected to a plurality of optical branching units of non-equal distribution for halfway branching one portion of the optical power of the optical signals, and also being connected to optical branching units of equal or unequal distribution for branching the optical power at a final point; a second optical amplifier for optically amplifying optical signal which have been damped during the transmission path; a plurality of optical/electrical converters for receiving optical signals branched at the final point or halfway of the optical fiber transmission path and for converting them into electrical signals; and a plurality of passenger seat picture image receiving terminals respectively connected electrically respective optical/electrical converters so as to receive the electric signals from the optical/electrical converters.

8. A picture image distributing apparatus provided within a passenger moving vehicle as defined in claim 7, where the head end portion is adapted to output one FM - FDM signal multiplexed in frequency in a multichannel FM picture image signal.

9. A picture image distributing apparatus provided within a passenger moving vehicle as defined in claim 7, where the head end portion is adapted to output one QAM-FDM signal multiplexed in frequency having multichannel signals multiplexed in frequency with respective digital picture image signals being modulated by a QAM system.

10. A picture image distributing apparatus provided within a passenger moving vehicle comprising:

a head end portion, related to picture image signals, and outputting electrical signals multiplexed in frequency;

an electrical/optical converter for converting the electrical signals from the head end portion into optical signals;

a first optical amplifier for optically amplifying the optical signals output from the electrical/optical converter, said first optical amplifier including a branching portion for dividing in two an optical output from said first optical amplifier;

two optical fiber transmission paths, a first transmission path and a second transmission path, connected to respective branching portions for transmitting optical signals from two outputs of the branching portions, said transmission paths being connected to a plurality of optical branching units of a fusion type having two inputs and two outputs of unequal distribution for halfway branching one portion of the optical power of optical signals;

a second optical amplifier for optically amplifying an optical output from a final point of the first transmission path and for inputting the amplified output to a final point of the second transmission path;

a third optical amplifier for optically amplifying an output from the final point of the second transmission path and for inputting the amplified outputs to the final point of the first transmission path;

a plurality of optical/electrical converters for receiving two optical signals outputted from two outputs of the optical branching units and for converting them into electrical signals so as to receive them in diversity; and at least one passenger seat picture image receiving terminal electrically connected to a respective optical/electrical converter for receiving the electrical signals from the optical/electrical converter.

11. A picture image distributing apparatus provided within a passenger moving vehicle comprising:

a head end portion, related to picture image signals, and outputting electrical signals multiplexed in frequency;

an electrical/optical converter for converting the electrical signals from the head end portion into optical signals;

a branching portion for branching in two optical outputs from the first optical amplifier;

two optical fiber transmission paths, a first transmission path and a second transmission path, connected to respective branching portions for transmitting the optical signals from branching portions, and connected in to a plurality of optical branching units of a fusion type having two inputs and two outputs of unequal distribution for halfway branching one portion of the optical power of the optical signals;

a second optical amplifier for optically amplifying the output from a final point of the first transmission path or second transmission path;

an optical switching portion for switching from one condition of inputting the output from the second optical amplifier to the second transmission path upon inputting the output from the final point of the first transmission path to the second optical amplifier to another condition of inputting the output from the second optical amplifier to the first transmission path upon inputting the output from the final point of the second transmission path to the second optical amplifier, and vice-versa;

a plurality of optical/electrical converters for receiving two optical signals from two outputs of the optical branching units and for converting them into electrical signals so as to receive them in diversity; and a plurality of passenger seat picture image receiving terminals respectively connected electrically to respective optical/electrical converters for receiving the electrical signals from the optical/electrical converters.

12. A picture image distributing apparatus provided within a passenger moving vehicle as defined in either one of claims 10 and 11, wherein the head end portion is designed to output one FM - FDM signal multiplexed in frequency with respect to a multichannel FM picture image signal.

13. A picture image distributing apparatus provided within a passenger moving vehicle as defined in either one of claims 10 and 11, wherein the head end portion is designed to output one QAM -FDM signal multiplexed in frequency with respect to a multichannel signal being modulated by the respective digital picture image signal in a QAM system.

14. A picture image distributing apparatus provided within a passenger moving vehicle as defined in any one of claims 1, 4, 7, 10 and 11, wherein the passenger seat picture image receiving terminal comprises: a channel selector for a passenger to be adapted as a man-machine interface; a tuner for selectively tuning to a desired channel by the channel selector from the output electrical signal of the optical/electrical converter; a demodulator for demodulating the tuning selected channel signal, and a picture image display for displaying the demodulated picture image signal.

15. A picture image distributing apparatus provided within a passenger moving vehicle as defined in any one of claims 2, 5, and 8, wherein the passenger seat picture image receiving terminal comprises: a channel selector for a passenger to be adapted as a man-machine interface, and a picture image displaying portion for displaying demodulated base-band picture image signals, the optical/electrical converters being adapted to tune and demodulate the desired channel by controlling from the channel selector, and the desired signal being transmitted as a formal of a base-band picture image signal from the optical/electrical converter onto the picture image display for the respective passenger seat picture image receiving terminal.

16. A picture image distributing apparatus provided within a passenger moving vehicle as defined in any one of claims 3, 6, and 9, wherein the passenger seat picture image receiving terminal comprises: a channel selector for a passenger to be adapted as a man-machine interface; a decoder for decoding the digital picture image signals which have been QAM demodulated, and a picture display for displaying the decoded picture image signal, the optical/electrical converter being adapted to tune the desired channel and QAM demodulate by control from the channel selector, and the desired picture image signal being transmitted in a form of digital picture image signals from the optical/electrical converter to the decoding portions of the respective passenger seat picture image receiving terminals.

17. A picture image distributing apparatus provided within a passenger moving vehicle as defined in any one of claims 3, 6, and 9, wherein the passenger seat picture image receiving terminal comprises: a channel selector to be adapted as a man-machine interface, and a picture image display for displaying a baseband picture image signal, the optical/electrical converter being adapted to tune of the desired channel, QAM demodulate, and decode the digital picture image signal by control of the channel selector, and the desired signal being transmitted in a formal of a baseband picture image signal from the optical/electrical converter to the picture image display of the respective passenger seat picture image receiving terminals.

18. A picture image distributing apparatus provided within a passenger moving vehicle as defined in any one of claims 4, 5, 6, where the optical amplifier is composed of an optical fiber amplifier, and the light for excitation is transmitted through an optical fiber transmission path from the head end side to excite the optical amplifier.

19. A picture image distributing apparatus provided within a passenger moving vehicle as defined in any one of claims 7,8, 9, 10, where a second optical amplifier is composed of an optical fiber amplifier, and the light for excitation is transmitted through an optical fiber transmission path from the head end side to excite the second optical amplifier.

20. A picture image distributing apparatus provided within a passenger moving vehicle as defined in claim 11, wherein the second optical amplifier and third optical amplifier respectively comprise optical fiber amplifiers, and the light source for optical excitation is transmitted through the first transmission path and second transmission path from the head end side to excite the second optical amplifier and third optical amplifier.

21. A picture image distributing apparatus provided within a passenger moving vehicle as defined in claim 18, where an optical branching unit is adapted to have a wavelength dependency where the light for excitation is not branched.

22. A picture image distributing apparatus provided within a passenger moving vehicle as defined in any one of claims 1 through 11, where the number of kinds of optical branching units are less than the number of branches.

23. A picture image distributing apparatus provided within a passenger moving vehicle as defined in any one of claims 1, 4, 7, 10 and 11, wherein at least the transmission paths and optical branching units are located at the wall plane or below the floor of the passenger moving vehicle, and the parts provided after the output point of the optical branching units are located within customer's cabins of the passenger moving vehicle.

24. A picture image distributing apparatus provided within a passenger moving vehicle as defined in any one of claims 1, 4, 7, 10 and 11, wherein at least the transmission paths, optical branching units and optical/electric converters are located at the wall plane or below the floor of the passenger moving vehicle, and the parts provided after the output point of the optical branching units are located within customer's cabins of the passenger moving vehicle.

25. A picture image distributing apparatus provided within a passenger moving vehicle as defined in claim 12, wherein the passenger seat picture image receiving terminal comprises: a channel selector for a passenger to be adapted as a man-machine interface, and a picture image display for displaying demodulated base-band picture image signals, the optical/electrical converters being adapted to tune and demodulate the desired channel by control from the channel selector, and the desired signal being transmitted as a format of a base-band picture image signal from the optical/electrical converter onto the picture image display for the respective passenger seat picture image receiving terminal.

26. A picture image distributing apparatus provided within a passenger moving vehicle as defined in claim 13, wherein the passenger seat picture image receiving terminal comprises: a channel selector for a passenger to be adapted as a man-machine interface; a decoder for decoding the digital picture image signals which have been QAM demodulated, and a picture image display for displaying the decoded picture image signal, the optical/electrical converter being adapted to tune the desired channel and QAM demodulate by control from the channel selector, and the desired picture image signal being transmitted in a form of digital picture image signals from the optical/electrical converter to the decoder of the respective passenger seat picture image receiving terminals.

27. A picture image distributing apparatus provided within a passenger moving vehicle as defined in claim 13, wherein the passenger seat picture image receiving terminal comprises; a channel selector to be adapted as a man-machine interface, and a picture image display for displaying a base-band picture image signal, the optical/electrical converter being adapted to tune the desired channel, QAM demodulate, and decode the digital picture image signal by control of the channel selector, and the desired signal being transmitted in a format of a base-band picture image signal from the optical/electrical converter to the picture image display of the respective passenger seat picture image receiving terminals.

28. A picture image distributing apparatus provided within a passenger moving vehicle as defined in claim 19, where an optical branching unit is adapted to have a wavelength dependency where the light for excitation is not branched.

29. A picture image distributing apparatus provided within a passenger moving vehicle as defined in claim 20, where an optical branching unit is adapted to have a wavelength dependency where the light for excitation is not branched.

30. A picture image distributing apparatus provided within a passenger moving vehicle as defined in claim 28, where the number of kinds of optical branching units are less than the number of branches.

31. A picture image distributing apparatus provided within a passenger moving vehicle as defined in claim 29, where the number of kinds of optical branching units are less than the number of branches.

* * * * *